United States Patent [19]

Heinzl et al.

[11] 4,253,103

[45] Feb. 24, 1981

[54] INK SUPPLY CONTAINER FOR INK WRITING SYSTEMS

[75] Inventors: Joachim Heinzl; Wilfried Kindler, both of Munich, Fed. Rep. of Germany

[73] Assignee: Siemens Aktiengesellschaft, Berlin & Munich, Fed. Rep. of Germany

[21] Appl. No.: 956,407

[22] Filed: Oct. 31, 1978

Related U.S. Application Data

[63] Continuation of Ser. No. 775,948, Mar. 9, 1977, abandoned.

[30] Foreign Application Priority Data

Mar. 12, 1976 [DE] Fed. Rep. of Germany ....... 2610518

[51] Int. Cl.[3] .............................................. G01D 15/18

[52] U.S. Cl. ................................ 346/140 R; 400/126; 101/366; 101/364

[58] Field of Search ................... 101/1, 363, 366, 364; 400/126; 346/140 R, 140 A, 75; 401/156, 158, 160, 162, 163, 167; 222/95, 214; 417/413

[56] References Cited

U.S. PATENT DOCUMENTS

| | | | |
|---|---|---|---|
| 1,781,504 | 11/1930 | Ford | 401/153 X |
| 3,089,465 | 5/1963 | West | 401/163 X |
| 3,128,144 | 4/1964 | Roerty | 346/140 |
| 3,482,258 | 12/1969 | Steen | 101/366 X |
| 3,708,798 | 1/1973 | Hildebrand | 346/75 |
| 3,777,307 | 12/1973 | Duffield | 346/140 |
| 3,832,579 | 8/1974 | Arndt | 346/75 |
| 3,893,623 | 7/1975 | Toupin | 346/75 X |
| 3,950,761 | 4/1976 | Kashio | 346/140 R |
| 4,149,172 | 4/1979 | Heinzl et al. | 346/140 R |

*Primary Examiner*—J. Reed Fisher

*Attorney, Agent, or Firm*—Hill, Van Santen, Steadman, Chiara & Simpson

[57] ABSTRACT

A removable ink supply container for automatic ink writing systems consisting of a housing member defining a well with an ink chamber located in the well. The ink chamber has a flexible top closure and a bottom discharge opening blocked by a pierceable seal. A pressure applying member is positioned above the flexible top for applying pressure to the ink. The housing is easily detachable from a writing carriage adjacent the writing head to supply ink to the writing head.

11 Claims, 2 Drawing Figures

INK SUPPLY CONTAINER FOR INK WRITING SYSTEMS

This is a continuation, of application Ser. No. 775-948, filed Mar. 9, 1977 and now abandoned.

BACKGROUND OF THE INVENTION

1. Field of the Invention

This invention relates to high speed writing equipment and more particularly to ink supplies for such equipment.

2. Prior Art

The invention disclosed herein is directed to the provision of an ink supply for ink writing systems wherein the ink supply is exchangeable within the mechanism to allow ease of replenishment of ink for the writing mechanism. The supply includes an ink bag or chamber which has a flexible wall portion. The chamber is sealed and has a dispensing opening sealed with an elastomeric member which can be pierced by a hollow needle to draw off ink from within the chamber.

High speed ink writing devices presently in use or contemplated include, among other types, those having writing head carriages which are moved longitudinally past a record carrier on which a record is to be made. The writing head attached to the carriage is supplied with writing liquid to be applied to the record carrier which may be a sheet of paper. The writing liquid, normally ink, is supplied to the writing head through a supply system from a supply bottle.

In a known type of writing head, the head includes an ink dispensing portion which consists of a mosaic of ink jets having open dispensing orifice ends located at a face of the writing head. The ink jets may be piezo-electrically driven to squirt or eject ink from the opening across a small gap or air space onto the recording carrier. Activation of the individual jets is controlled from a writing head control center which forms no part of this invention. It is common in such devices that the individual piezo-electrically driven nozzles are quite small in diameter and it is known to have them dimensioned with respect to the liquid being used so that they are self filling with ink as a result of capillary action. Thus during the writing process ink will be constantly drawn into the writing head.

Due to the physical principles involved in supplying the ink and in squirting the ink onto the recording carrier, it is critically important to prevent air entry and entrapment within the supply system. When the writing system is put into operation initially, and importantly, when the ink supply container is changed, it is necessary to insure that the entire ink system is filled with ink.

In order to insure that the entire ink supply system, including the individual jets themselves, are properly filled with ink, it has been known to apply an overpressure on the ink supply for a short period of time. This overpressure causes a positive ink flow through the writing head thus flushing the entire supply system and the writing head with the ink. This assures that there is no trapped air present in the system.

Flushing also has the highly desirable effect of insuring that any dirt or any other contaminants which might possibly have entered the system will also be flushed out.

A typical type of ink container known to the art comprises a flexible ink bag which is supplied with ink for the writing head. The ink bag has a casing which is provided with ink passage openings extending in a vertical direction within the ink bag and forming exit channels for the ink. The ink passage openings both seal the ink bag and provide a connection to a hollow needle connecting the ink bag with the supply line of the writing head. This type of sealing allows the use of a sealed system.

It would be an improvement in the art to provide ink supply systems which have the sealing advantages discussed above, which are capable of being used in the flushing manner discussed above but which are easily removed from the writing system and easily replaced. It would also be an advance in the art to provide such systems with convenient means for disposing of the waste ink generated by the flushing process.

SUMMARY OF THE INVENTION

It is therefore a primary object of this invention to provide an easily replaceable underpressure ink supply container for ink writing systems.

It is a part of the primary object of this invention to provide such easily replaced ink supply containers which are capable of creating an overpressure condition in the ink system for short periods of time to allow forced ink flow for flushing the writing system while simultaneously providing a collection point for waste ink dispensed from the writing nozzles of the writing head during the flushing operation.

These objectives are met in the present invention, in part by providing an ink supply system including a removable ink supply container positioned with respect to the writing head such that the ink contained in the supply container is at a lower pressure level than the surrounding atmosphere at the writing head with the supply container equipped with a device permitting short term pressure increases.

In the described embodiment, an ink bubble or bag is positioned in a tub shaped recess in a housing member having high side walls which extend above the ink bag. A pressure applying button or stamp member is guided by the side walls above the ink bag and is urgable against a spring into contact with the ink bag, the ink bag having at least one flexible wall contactable by the pressure button. The ink bag is closed by a piercable seal for dispensing the ink and the housing contains a chamber for receiving and storing waste ink.

In the specific embodiment described, the housing is adapted to be carried by the writing head mechanism in close proximity to the writing face and the writing head mechanism is equipped with a channel for return of waste ink from the writing face to the collector portion of the removable ink supply container housing. In addition the writing head is provided with a deflector for deflecting the waste ink into the return channel.

This invention has one highly desired advantage in that when the ink supply container has been placed in position with respect to the writing head, a simple manual pressure on the pressure button will insure that the entire ink supply system as well as the writing head will be filled with ink. This, as discussed above also insures that any air bubbles which may be created during the writing operation will be simultaneously removed. The waste ink which is generated during the flushing is automatically collected in a collection chamber associated with the ink supply container so that the waste ink is removed at the time the ink supply container is changed.

In the preferred embodiment illustrated, the spring element against which the pressure button operates constitutes a folded bellow spring which, in its free state, maintains the pressure button out of contact with the ink bag. In this manner, the desired pressure level within the ink bag is easily established and maintained without the pressure button influencing that condition.

The pressure differential in the supply container is preferably a pressure differential with respect to the writing head since it is desired that the ink in the supply container not be at a higher pressure which would cause ink flow through the writing head jets when the writing head is turned off. Any such ink flow through the writing jets during a period of non-operation of the writing head would create a messy situation. It is therefore desired that the pressure on the ink supply be maintained below that necessary to cause a positive flow. This is accomplished in the present invention by locating the ink bag below the writing head so that there is an uphill flow required from the ink bag to the writing head. Thereafter by assuring that the pressure of the ink within the ink bag is no greater than atmospheric pressure at the writing head, it can be assured that there will be no forced flow to the writing head. Conversely, since the writing head operates by capillary action, it is assured that there will be sufficient ink flow to assure that the overall ink supply system will not self-empty during the non-operation of the writing head since the capillary action will prevent a return flow to the ink bag. Since the capillary forces normally extend to immediately adjacent the exit opening of the individual writing orifices or jets, they will further insure that there will be no air intrusion into the supply system.

The ink supply container herein disclosed is extremely simple to handle. In order to change ink supply, either to replenish the same or for other reasons it is only necessary to remove the container, including the waste ink collector portion, by pulling the container away from the writing head carriage and by replacing it with a new container containing a full ink bag.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
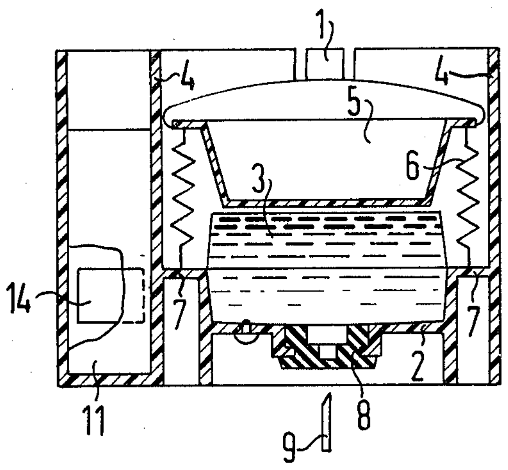
FIG. 1 is a cross-sectional view through an ink supply container according to this invention.

FIG. 1 illustrates, in cross section, an ink supply container according to this invention. The container consists of a housing member 1 which preferably is formed as a plastic extrusion or molding and which has a tub shaped recess 2 in a bottom portion. The tub shaped recess 2 is closed by a flexible member such as a flexible foil. The recess 2 is partially bounded within the depth of the housing by marginal walls 7 and the foil may be welded to the margins. Thus the bottom and side walls of the recess 2 and the foil form an ink receiving flexible bag 3.

The side walls of the housing extend upwardly beyond the ink bag 3 and form confining guide surfaces for a pressure button 5 having a bottom face opposed to a portion of the flexible foil. The pressure button 5 may also be attached to the margin 7 through a bellows spring 6. The bellows spring 6 is of a free length when attached to the button to maintain the bottom face of the button above the ink bag in such a manner that the button does not apply pressure to the flexible ink bag.

The bottom wall of the tub shaped recess 2 has a discharge opening therein which is closed with an elastomeric seal member 8. The seal member 8 is effective to close the ink bag 3 with respect to the ink supply system (not shown). Communication with the ink supply system is by means of a hollow needle 9 which in turn is in communication with ink supply conduits to the writing head of the ink writing system.

In order to place a given ink supply container in ink supplying communication with the writing head ink supply system it is only necessary to insert the container into an appropriately shaped receptacle area of the writing carriage 10 of the ink writing system whereupon the then centrally positioned hollow needle 9 will pierce the elastomeric seal 8 placing the open end of the needle in communication within the bag 3. The seal 8 is preferably of the type which will maintain an air tight seal around the needle 9, and may be of the type which will be self-closing upon withdrawal of the container from the needle 9.

Since ink inlet to the ink supply system of the writing head is only through the needle 9, it is possible to withdraw the ink container from the ink supply system without requiring emptying of the ink supply system. Because of the nonpositive pressure capillary flow system above described, in the event of withdrawal of the supply container from the ink supply system, there will be no backflow of ink through the needle 9.

As an additional feature, a part of the housing 1 functions as a collection chamber 11 for waste ink. The collection chamber 11 is placed in communication with the outlet openings of the writing head 12 via a channel conduit 13. In this manner waste ink flowing from the writing head openings during the flushing operation will be returned to the housing 1. A wick or the like absorbent material mass 15 is positioned in the collector chamber 11 and absorbs the waste ink flowing from the channel 13 through the entrance opening 14 to the collection chamber 11.

Figure 2:
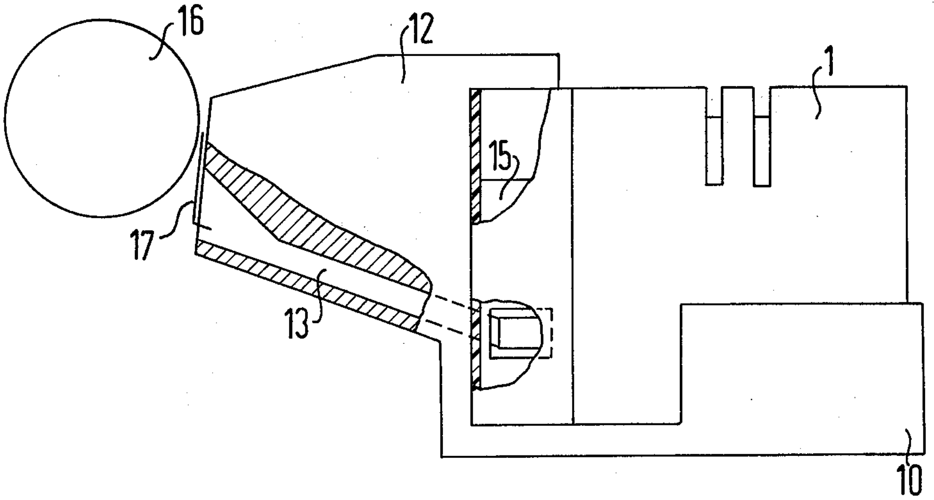
FIG. 2 is a diagrammatic representation of the ink supply container of FIG. 1 positioned in association with a writing carriage of an ink jet writing system.

As shown in FIG. 2 the ink supply container including the entire housing 1 with the therein carried ink bag 3 is attached to and carried by the writing carriage 10 of the writing system. The attachment to the writing carriage 10 is such that the ink bag 3 is located somewhat below the exit openings of the jets of the writing head 12 which are located at the point of the writing head opposed to the roller 16 carrying the recording carrier and above the channel 13. By placing the ink bag 3 below the jet openings, it is assured that an underpressure exists between the ink bag and the jet openings. Thus the writing system will be sealed with respect to the roller 16 due to the capillary action of the nozzles. The capillary action, as explained above, assures that the writing head 12 will not empty of ink during a rest or nonactuated time period.

Use of the ink supply container described above is as follows: When the ink bag 3 has been emptied as a result of operation of the writing head, the operator of the machine can gain access to the writing carriage by opening a protective lid to that area of the device. The protective lid is not herein shown but is normally positioned above the writing carriage 10. Upon opening the lid a sensor device is activated which may be a normally open switch. Activation of the sensor device will cause an ink deflection shield 17 to be moved into position downstream of the nozzles openings of the writing head. The ink deflection shield is dimensioned and positioned such that, when in position between the nozzle openings and the roller 16, ink exiting the nozzle openings will be directed to the channel 13.

After opening the lid, the entire housing 1 is simply removed from the carriage with waste ink in the wick 15 being removed therewith without the operator contacting any of the waste ink. The entire supply container can be thereafter be discarded since it represents a relatively inexpensive construction. After a new ink supply container has been inserted in the writing carriage 10, a flushing overpressure can be produced by pressing the pressure button 5 against the bellows spring 6 into contact with the foil cover of the ink bag. Since, in the embodiment illustrated, the pressure button is freely accessible from the top of the housing, flushing can be easily achieved.

During the insertion of the new supply container, the seal 8 will have been pierced by the needle 9 carried by the writing carriage and the bag will be in communication with the ink supply system to the writing head 12. Therefore, activation of the pressure button 5 will cause a positive flow of ink through the writing head 12 out the jet openings into contact with the shield 17. Waste ink will flow from the shield 17 through the conduit 13 into the entrance 14 to the collection chamber 11 where it will be absorbed by the wick 15. Of course the activation of the pressure button 5 will insure that the entire ink supply system will be properly filled with ink and that all air in the ink supply will be eliminated.

When pressure on the button 5 is removed, the button will be automatically withdrawn from contact with the ink bag 3 by the spring 6. In this manner the favorable pressure balance on the ink supply will be reinstated. Since the ink bag is closed by a flexible material such as a flexible foil, withdrawal of ink from the ink bag into the ink supply system to the writing head will not change the pressure condition.

Due to the herein disclosed design, it is possible to produce the ink supply container in a simple and cost effective manner by means of plastic extrusion or the like mass production methods. In the preferred embodiment, the ink bag is defined, at least in part, by a deep drawn elastic foil which is glued, welded or the like attached to the peripheral margins 7 of the recess 2 in the housing 1. In order to initially fill the ink bag 3 with ink, after the formed rubber part 8 has been placed in position to close the opening through the bottom of the ink reservoir bag, it may be pierced by two hollow needles. In this manner one needle can fill the ink bag with fluid ink while the other needle withdraws any air contained in the ink bag. When using this system, it is important that the rubber or other elastic seal 8 be self-sealing upon withdrawal of the needles. Alternatively a separate sealed filling opening to the bag 3 may be provided.

Upon filling of the ink bag, it is a simple manner to attach the pressure button 5 with its associated bellow spring 6 and to thereafter insert the wick 15 in the collector chamber 11. Attachment of the bellows and of the wick is a simple process such that the entire assembly is extremely economical to manufacture.

As a result of this invention, we have provided an ink supply container for use in connection with ink writing systems which increases operational convenience and operational safety of the ink writing system. Replenishment of the ink supply is made convenient and speedy while eliminating all mess and substantially eliminating the possibility of air entrapment within the supply system which would otherwise adversely effect the operating characteristics of the writing head.

Although the teachings of our invention have herein been discussed with reference to specific theories and embodiments, it is to be understood that these are by way of illustration only and that others may wish to utilize our invention in different designs or applications.

We claim as our invention

1. An ink supply device for a jet ink writing system comprising in combination: a movable writing carriage having a writing head thereon, the writing head having a plurality of writing set orifices at a writing face of the writing head, conduit means within the writing head in communication with the orifices, a removable ink supply container, means on the carriage for mounting the ink supply container on the carriage, the conduits being in communication with the interior of a hollow needle member carried by the carriage, the container comprising a preformed plastic part having housing walls defining a recess, the recess having a bottom wall portion with an elastomeric seal member closing an opening through the wall portion, the recess closed at a top portion thereof by a flexible foil membrane, additional wall portions of the housing extending upwardly above the flexible membrane, a pressure button positioned between said additional wall portions, spring means urging the pressure button away from the membrane, the spring means having a free length sufficient to maintain a bottom face of the pressure button out of contact and opposed to the membrane, the pressure button being movable against the spring means to cause contact between the bottom of the pressure button and the membrane, a space between the bottom wall and the membrane being filled with ink and comprising an ink bag, the hollow needle member positioned to pierce the seal upon mounting of the container to the carriage, the container, when mounted to the carriage, being located with respect to the writing head orifices such that the ink supply within the recess is positioned below the writing orifices whereby there will not exist a pressure flow from the ink supply to the orifices, the orifices and conduits dimensioned to provide a capillary action flow of ink from the hollow needle to the orifices, the pressure button effective to increase pressure with the recess by movement of the pressure button against the membrane to cause a positive pressure flow of ink through the conduits, means carried by the writing head providing a deflection shield in front of the orifices for deflecting waste ink from the orifices to a discharge channel, the discharge channel formed within the writing head and carriage, the discharge channel having an open end adjacent the deflector means and a second open end adjacent the container carried by the carriage, the container having a waste ink collector chamber having an absorbent mass therein, the waste ink collector chamber having an entrance opening adjacent the second open end of the channel.

2. A jet ink writing system comprising a writing carriage member, a writing head having a plurality of jet orifices therein, conduits in the writing head for supplying ink from an ink source to the orifices, means for activating portions of the writing head to expel ink from selected orifices, the improvement of a replaceable ink supply container comprising a housing member, a partially flexible walled ink bag within said housing member, means for replaceably mounting the housing member on the carriage, a discharge opening for the ink bag, means sealing the discharge opening, means on the carriage for piercing the means sealing the discharge opening upon insertion of the container on the carriage, the piercing means effective to provide communication between the ink bag and the conduits, means maintaining pressure within the ink bag below atmospheric pressure at the orifices whereby a positive pressure ink flow does not exist between the ink bag and the orifices, pressure applying means carried by said container, said pressure applying means being selectively actuatable to partially compress the ink bag to create a greater pressure on ink within the ink bag whereby actuation of the pressure applying means causes a positive flow of ink from the ink bag through the piercing means and conduits and out of the orifices, the container comprising a housing member having a tub-shaped recess defined by housing walls with portions of the housing walls extending above the recess, the ink bag including a part of the recess, the pressure applying means comprising a movable pressure button positioned within the housing walls above the recess, a spring means between the button and the recess acting on the pressure button urging it away from bottom portion of the recess, the pressure button being movable against the spring into contact with the ink bag.

3. The device of claim 2 wherein the means maintaining the pressure comprises a mounting for the ink supply container on the carriage, said mounting located below the level of the orifices by a distance sufficient to maintain the ink bag below the orifices when the container is mounted on the carriage.

4. The device of claim 3 wherein the orifices are supplied with ink from the ink supply by capillary action.

5. The device according to claim 2 wherein the ink bag includes a top closure for the recess, the top closure positioned between the pressure button and a bottom wall of the recess, the top closure being a flexible member.

6. The device according to claim 5 wherein the housing includes a collector chamber for storing waste ink.

7. The device according to claim 6 wherein the flexible material is a plastic foil attached to wall portions adjacent the recess.

8. The device according to claim 7 wherein the spring means is a folded bellows spring having a free length sufficient to maintain the pressure button out of contact with the flexible foil in the absence of manual pressure applied to the pressure button.

9. The device according to claim 8 wherein the collector chamber has an absorbing material received therein.

10. The device according to claim 2 wherein the means sealing the discharge opening is an elastomeric seal pierceable by a hollow needle while maintaining an air tight seal around the hollow needle, the piercing means including a hollow needle.

11. The device of claim 10 wherein the sealing means is self sealing upon withdrawal of the piercing needle.

* * * * *